(12) United States Patent
Ryu et al.

(10) Patent No.: US 8,410,629 B2
(45) Date of Patent: Apr. 2, 2013

(54) TAPERED MAGNETIC THRUST BEARING WITHIN AN ELECTRIC GENERATOR WITH ADJUSTING AIR GAP CONTROLS

(76) Inventors: Byung-Sue Ryu, Seoul (KR); Young-Sil Yu, Seoul (KR)

( * ) Notice: Subject to any disclaimer, the term of this patent is extended or adjusted under 35 U.S.C. 154(b) by 312 days.

(21) Appl. No.: 12/774,385

(22) Filed: May 5, 2010

(65) Prior Publication Data
US 2011/0241348 A1 Oct. 6, 2011

(30) Foreign Application Priority Data
Apr. 1, 2010 (KR) .................. 10-2010-0029684

(51) Int. Cl.
*F03D 9/00* (2006.01)
(52) U.S. Cl. .................................. 290/55; 310/90.5
(58) Field of Classification Search ............. 310/90.5, 310/156.04
See application file for complete search history.

(56) References Cited

U.S. PATENT DOCUMENTS

| | | | | |
|---|---|---|---|---|
| 5,360,470 A | * | 11/1994 | Ono et al. | 104/284 |
| 5,894,181 A | * | 4/1999 | Imlach | 310/90.5 |
| 6,707,200 B2 | * | 3/2004 | Carroll et al. | 310/90.5 |
| 6,982,505 B2 | * | 1/2006 | Horng et al. | 310/51 |
| 2006/0012258 A1 | * | 1/2006 | Sun et al. | 310/90.5 |
| 2008/0042504 A1 | * | 2/2008 | Thibodeau et al. | 310/90.5 |
| 2008/0122308 A1 | * | 5/2008 | Mleux | 310/90.5 |

FOREIGN PATENT DOCUMENTS
KR 10-0743475 7/2007
* cited by examiner

*Primary Examiner* — Vanessa Girardi
(74) *Attorney, Agent, or Firm* — Cantor Colburn LLP

(57) ABSTRACT

A magnetically balanced electric generator is provided, which includes a rotor rotating, a fixing structure having a fixing axis, a rotating magnet body movably coupled with the fixing axis, and engaged with the rotor, a power-generating block vertically separated from the rotating magnet body, a first magnet mounted along the circumference of the rotating magnet body, a second magnet mounted along the circumference of the power-generating block, power-generating magnets mounted in the rotating magnet body and rotating about the fixing axis upon rotation of the rotating magnet body, power-generating units mounted in the power-generating block to generate electricity because of interaction with the power-generating magnet, and a gap control unit moving the rotating magnet body with an interaction of an external force to control a gap between the rotating magnet body and the power-generating block.

4 Claims, 5 Drawing Sheets

TAPERED MAGNETIC THRUST BEARING WITHIN AN ELECTRIC GENERATOR WITH ADJUSTING AIR GAP CONTROLS

BACKGROUND OF THE INVENTION

1. Field of the Invention

The present invention relates, in general, to an electric generator using a permanent magnet in a shape of a tapered cone, especially, one which induces a useful equilibrium of magnetic force and, more particularly, to a magnetically balanced electric generator, in which a power-generating core unit and a power-generating magnet are spaced apart at constant intervals using a magnetically repulsive force, which is caused by a permanent magnet shaped like a tapered cone, and a magnetically attractive force, which is caused between the power-generating core unit and a power-generating magnet, and the interval is controlled depending on the intensity of wind, thereby improving power-generation efficiency, the lifetime of parts, and economical efficiency of products.

2. Description of the Related Art

Generally, an electric generator means a device that includes a rotor which rotates under external force, a fixing structure supporting the rotor, and an electricity-generating unit which operates upon rotation of the rotor. However, bearings of such electric generators have a problem in that a certain amount of oil should be regularly supplied to the bearings and the contamination of foreign substances causes damage to the bearings.

Further, in case of wind turbines using wind power as an external force, an electrical-connection controller should be installed in order to generate electricity as expressed by the formula $E=C_p \times (1/2) \times \rho \times A \times v^3$, which however is difficult work, and thus problems such as the complexity of parts, burning-out of electric parts or the like occur. Wind turbines are the hardest kinds of electric generators to design because they have to deal with energy proportional to cubic wind velocity.

Meanwhile, the applicant developed a new construction electric generator in consideration of the fact that existing vertical type wind generators do not sufficiently utilize wind power, which generator was disclosed in Korean Patent Registration No. 0743475.

FIG. 1 shows the structure of the electric generator in a cross-sectional view.

The disclosed electric generator is called a variable electric generator for a wind turbine, which includes a group 11 of magnets which is installed on a lower end of a rotor 10 rotating with the wind, a plurality of core units 21 which is installed in a fixing structure in such a manner as to be arranged concentrically with the magnets of the group and which upon rotation of the rotor 10 interacts with the magnets to thereby generate electricity, an anemometer 30 detecting the magnitude of wind velocity, an electric accumulator 40 storing electricity generated by the core unit 21, and a terminal 50 connecting the respective core units 21 and the electric accumulator together such that the core units are selectively connected with the electric accumulator according to the wind velocity detected by the anemometer 30.

The variable electric generator of this type changes a power-generating condition depending on the intensity of wind, having such advantages as more efficiently utilizing wind power.

In the meantime, in order to generate electricity using interaction between the power-generating magnet and the core unit, in which a coil is wound around a silicon steel plate, an interval between the power-generating magnet and the core unit should be maintained to approximately 1 mm. Then, since the interval is maintained by a spherical steel bearing 61, which is mounted between the rotor and the fixing structure, the bearing should be periodically lubricated so that the interval can be maintained accurately and efficiently, which is troublesome work, otherwise the bearing may burn out during use, problematically requiring replacement with new one.

Furthermore, problems such as contact points burning out during manipulation of the power-generating coil, which may result in a reduction in lifetime, may occur.

SUMMARY OF THE INVENTION

Accordingly, the present invention has been made keeping in mind the above problems occurring in the related art, and the present invention intends to propose a magnetically balanced electric generator in which a rotating magnet body is separated at a constant interval from a power-generating block, thereby maintaining a magnetically balanced interval between a power-generating core unit and a power-generating magnet, without providing a separate spherical steel bearing, using a magnetically repulsive force between two magnets each having the shape of a tapered cone, and a magnetically attractive force occurring between the power-generating magnet and the power-generating core unit, thereby solving problems such as replacement or the like of a bearing being a nuisance and accompanied by cost increases.

Another object of the present invention is to provide a magnetically balanced electric generator in which an interval between a power-generating core unit and a power-generating magnet is controlled according to the intensity of wind, thereby considerably improving the efficiency of power generation.

In order to achieve the above objects, according to one aspect of the present invention, there is provided a magnetically balanced electric generator including: a rotor rotating with external force; a fixing structure having a fixing axis rotatably supporting the rotor; a rotating magnet body coupled with the fixing axis in such a manner as to be movable therealong, and engaged with the rotor so as to rotate together with the rotor; a power-generating block installed on the fixing structure while being vertically separated from a lower portion of the rotating magnet body; a first magnet mounted along the circumference of the rotating magnet body; a second magnet mounted along the circumference of the power-generating block and generating a repulsive force while repelling the first magnet, thereby magnetically separating the rotating magnet body from the power-generating block; a plurality of power-generating magnets mounted in the rotating magnet body and rotating about the fixing axis upon rotation of the rotating magnet body; a plurality of power-generating units mounted in the power-generating block such that they are positioned vertically downwards with respect to the power-generating magnet, and generating electricity because of the interaction with the power-generating magnet upon rotation of the power-generating magnet; and a gap control unit moving the rotating magnet body because of the interaction with an external force so as to control a gap between the rotating magnet body and the power-generating block and therefore control a gap between the power-generating magnets and the power-generating core units, variably changing the amount of power generation.

In an exemplary embodiment, the gap control unit may include a reaction lever hinge-coupled to the fixing structure and rotating about a hinge axis when under external force; and a connector, upon rotation of the reaction lever, connecting the reaction lever and the rotating magnet body so as to pull down the rotating magnet body.

In an exemplary embodiment, the first and second magnets may have a tapered cone shape, the upper portion of which is wider than the lower portion.

In an exemplary embodiment, the external force may be wind power which rotates the rotor so that electricity is generated with interaction between the power-generating core units and the power-generating magnets.

According to the construction of the present invention, the rotating magnet body rotates together with the rotor while being maintained at a constant interval from the upper portion of the power-generating block because of the repulsive force between the two tapered conical magnets and the attractive force occurring between the power-generating core units and the power-generating magnets, thereby providing convenience of maintenance and reducing energy loss by resistance because a separate bearing is not used.

Further, as external force applied to the rotor increases, the power-generating magnets and the power-generating core units become proximal to each other, whereas on the other hand as external force applied to the rotor decreases, for example the wind blows comparatively lightly, the power-generating magnets are allowed to be spaced far away from the power-generating core units. That is, in the correlated equation $F=k \times (m_1 \times m_2)/r^2$, if an interval decreases, F and the amount of power generation will increase proportional to $1/r^2$, and if an interval increases, the amount of power generation will decrease proportional to $1/r^2$, thereby providing efficient power generation in conformity with wind velocity.

That is, referring to the correlated equation $E=C_p \times (\frac{1}{2}) \times \rho \times A \times v^3$, there is an implementation in which a power generator suitable for a 3-dimension $v^3$, a device that corresponds to the 3-dimensions of $(1/r)^2 \times v_c$, is realized. Here, E indicates power-generation energy, $C_p$ indicates the efficiency, $\rho$ indicates air density, A indicates the cross section that is subject to wind, v indicates the wind velocity, $v_c$ indicates relative velocity of a power-generating magnet to the power-generating core unit according to the wind velocity, and r indicates a distance between the power-generating core unit and the power-generating magnet.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
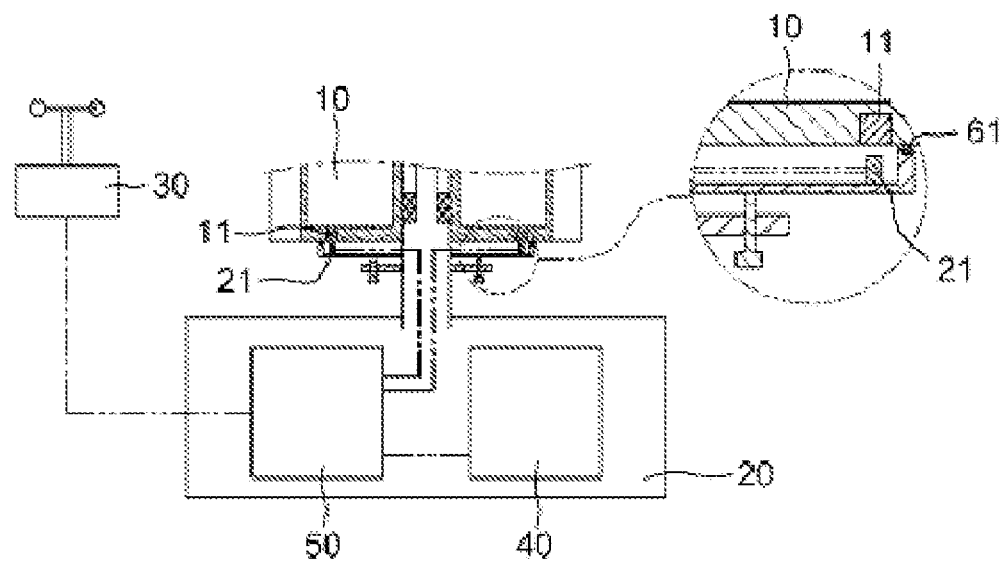
FIG. 1 is a cross-sectional view illustrative of the structure of a conventional variable electric generator.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
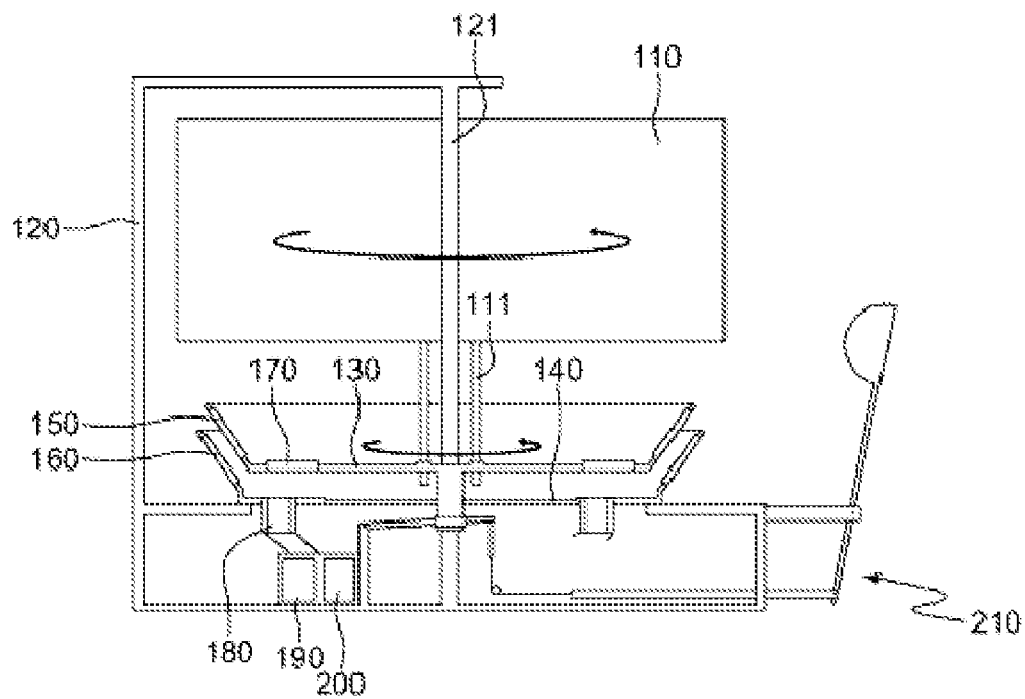
FIG. 2 is a front view illustrative of the structure of a magnetically balanced electric generator according to a preferred embodiment of the present invention.
Figure 3:
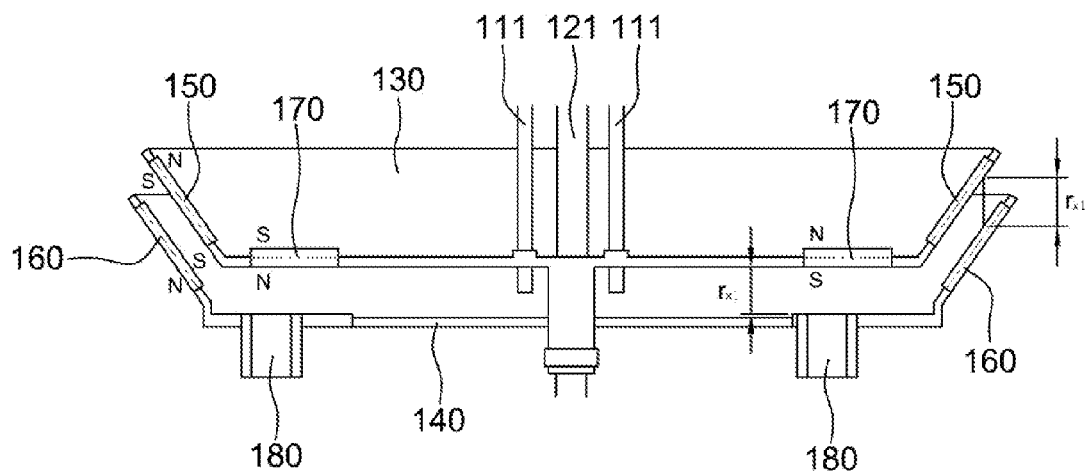
FIG. 3 is a front view illustrative of the major structure of the electric generator of FIG. 2.
Figure 4:
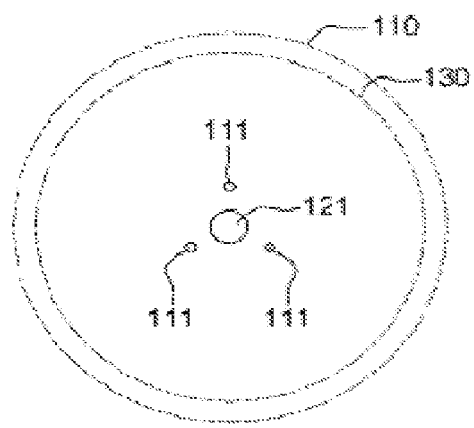
FIG. 4 is a plan view illustrative of the coupling structure between a rotor and a rotating magnet body according to an embodiment of the present invention.
Figure 5:
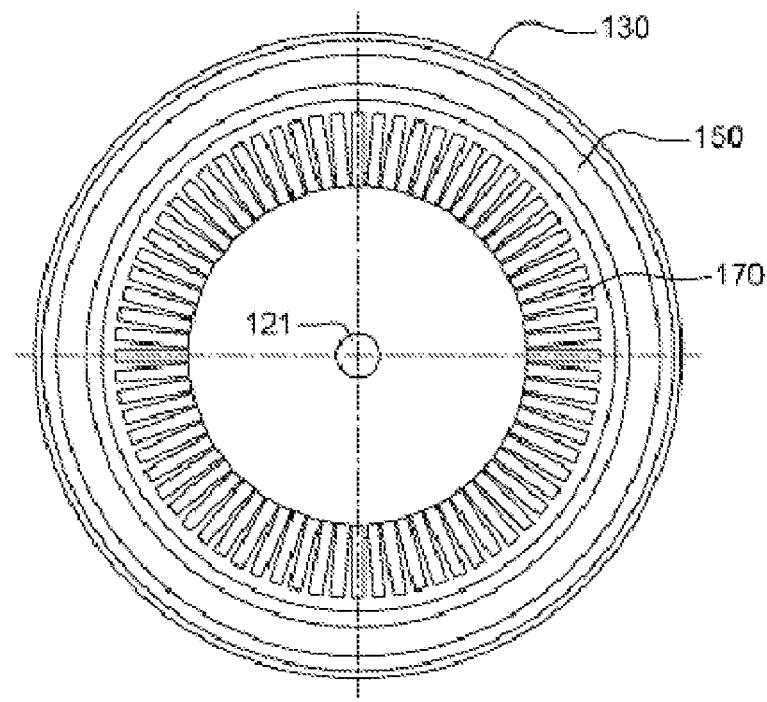
FIG. 5 is a plan view illustrative of the rotating magnet body.
Figure 6:
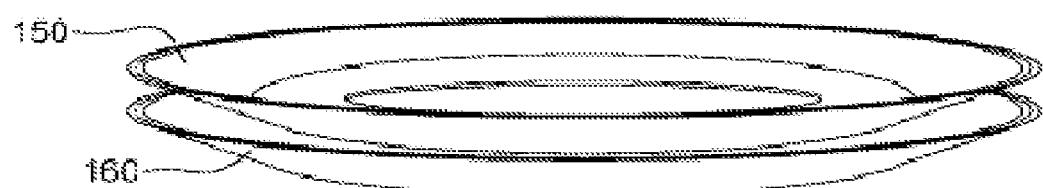
FIG. 6 is a perspective view illustrative of first and second magnets according to an embodiment of the present invention.
Figure 7:
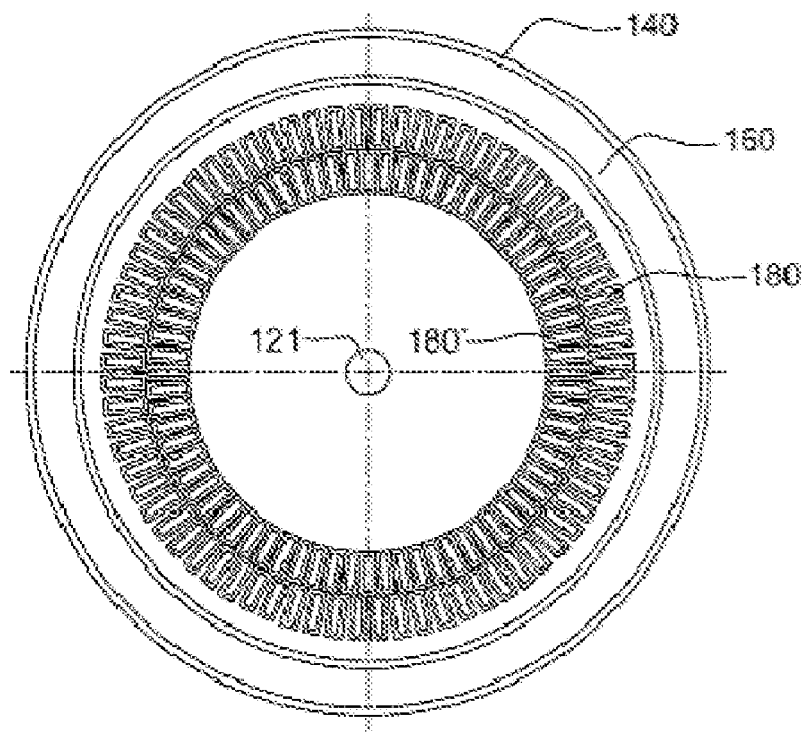
FIG. 7 is a plan view illustrative of a power-generating block according to an embodiment of the present invention.
Figure 8:
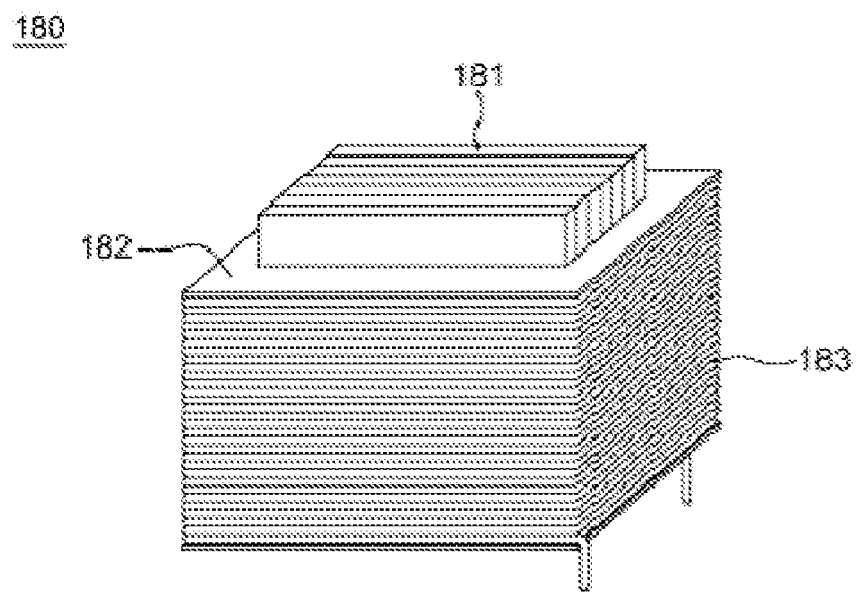
FIG. 8 is a perspective view illustrative of a power-generating core unit according to an embodiment of the present invention.

FIG. 2 is a front view illustrative of the structure of a magnetically balanced electric generator according to a preferred embodiment of the present invention, FIG. 3 is a front view illustrative of the major structure of the electric generator of FIG. 2, FIG. 4 is a plan view illustrative of the coupling structure between a rotor and a rotating magnet body according to an embodiment of the present invention, FIG. 5 is a plan view illustrative of the rotating magnet body, FIG. 6 is a perspective view illustrative of first and second magnets according to an embodiment of the present invention, FIG. 7 is a plan view illustrative of a power-generating block according to an embodiment of the present invention, and FIG. 8 is a perspective view illustrative of a power-generating core unit according to an embodiment of the present invention.

The magnetically balanced electric generator of the present invention includes a rotor 110, a fixing structure 120, a rotating magnet body 130, a power-generating block 140, a first magnet 150, a second magnet 160, power-generating magnets 170, and power-generating core units 180.

The rotor 110 rotates under external force, which may include wind power, water power, vapor pressure, process pressure (e.g. brake pressure) which is produced during the operation of devices, wherein the magnetically balanced electric generator of this embodiment has a structure optimally suitable for wind power.

The fixing structure 120 rotatably supports the rotor 110 and has a vertical fixing axis 121.

The rotating magnet body 130 is coupled with the fixing axis 121 such that it is movable along the fixing axis 121. It is also engaged with the rotor 110 by means of an engaging rod 111 body so as to rotate together with the rotor 110.

Meanwhile, the engaging rod body 111 consists of a plurality of rods, which is arranged in a circular form about the fixing axis 121 and extends from the undersurface of the rotor 110 over the rotating magnet body 130. Such a structure of an engaging rod body 111 allows the rotating magnet body 130, which is coupled with the rotor 110 via the engaging rod body 111, to rotate about the fixing axis 121 upon rotation of the rotor 110, and it also allows the rotating magnet body 130 to move freely in a vertical direction, provided that the rotating magnet body 130 is requested to be moved by the repulsive force occurring between the first and second magnets 150 and 160, the attractive force occurring between the power-generating magnets 170 and the power-generating core units 180, or the action of the gap control unit 210, which will be described later.

The power-generating block 140 is mounted on the fixing structure 120 in such a manner as to be vertically spaced from a lower portion of the rotating magnet body, so as to provide space for mounting the power-generating core units 180.

The first magnet 150 is mounted in the rotating magnet body 130 and reacts with the second magnet 160 to thereby produce a repulsive force which keeps the rotating magnet body 130 separated away from the power-generating block 140. The first magnet 150 has the structure of a circular ring, preferably having the shape of a tapered cone, like a horn, the upper portion of which is wider than the lower portion, the circular ring extending along the circumference of the rotating magnet body 130.

The second magnet 160 is mounted in the power-generating block 140 and reacts with the first magnet 150 to thereby produce the repulsive force. The second magnet 160 also has the structure of a circular ring, preferably having the shape of a tapered cone, like a horn, the upper portion of which is wider than the lower portion, the circular ring extending along the circumference of the power-generating block 140.

Being made for the first and second magnets 150 and 160 into tapered cones naturally prevents the rotating magnet body 130, which is magnetically separated from the power-generating block 140 by the repulsive force, from deviating laterally, thereby relieving the load to be applied to the fixing axis 121 or the engaging rod body 111.

Meanwhile, the first and second magnets 150 and 160 are arranged so as to face each other at the same polarities, in order to produce the repulsive force. In FIG. 3, the arrangement is shown in which S polarities of the first and second magnets 150 and 160 face each other.

The power-generating magnet 170 consists of a plurality of magnets 170, which is arranged in a circular form about the fixing axis 121 in the rotating magnet body 130 such that upon rotation of the rotor 110, the magnets 170 also rotate about the fixing axis 121. Here, the magnets 170 are arranged such that adjacent magnets in alternation have opposite polarities for AC power generation. For example, in the case of a magnet 170 having N polarity at its lower side, the opposite magnets 170 adjacent to the former magnet are arranged to have S polarities on the lower sides.

The power-generating core unit 180 consists of a plurality of core units, which is arranged in a circular form about the fixing axis 121 in the power-generating block 140. Each core unit 180 is provided with a coil 183 which is wound around a core 182 having therein a plurality of silicon steel plates 181. The core units are arranged vertically downwards from the power-generating magnets 170 so that upon rotation of the rotating magnet body 130, N and S polarities of the magnets 170 in alternation pass over the upper portion of the core units 180 so as to generate alternating magnetic flux, which causes the coil of the core unit 180 to be voltage-induced, thereby generating the electricity.

The power-generating core units 180 are connected with an electric accumulator 200 via a voltage controller 190 so as to convert the generated electricity to direct current electricity and store it in the electric accumulator. The voltage controller 190 converts irregular voltage, which is generated from the plurality of core units 180, into constant voltage, and transfers it to the electric accumulator 200.

In the power generation process of the power-generating magnets 170 and the power-generating core units 180, an attractive force is generated between the magnets 170 and the core units 180. This attractive force and the repulsive force, which occurs between the first and second magnets 150 and 160, become balanced to thereby provide a magnetically balanced equilibrium state, which allows the rotating magnet body 130 to stably rotate while maintaining a constant distance with the power-generating block 140, even without using a bearing.

Generally, magnetic intensity between two magnets is obtained using Coulomb's law, which can be generally expressed by the following equation 1:

$$H = k \times (m_1 \times m_2)/r^2 \quad \text{Equation 1}$$

Meanwhile, the repulsive force between the first and second magnets can be expressed by the following equation 2, using equation 1.

$$H_r = k \times (m_{r1} \times m_{r2})/r_r^2 \quad \text{Equation 2}$$

(here, $m_{r1}$ and $m_{r2}$ are the intensity of the first and second magnets, and $r_r$ is an interval between the first and second magnets)

Meanwhile, the attractive force between the power-generating magnets and power-generating core units can be expressed by the following equation 3, using equation 1.

$$H_a = k \times (m_{a1} \times m_{a2})/r_a^2 \quad \text{Equation 3}$$

(here, $m_{a1}$ and $m_{a2}$ are the intensity of the power-generating magnets and magnetized power-generating core units, and $r_a$ is an interval between the power-generating magnets and the power-generating core units)

If $r_r < r_a$ when $m_{r1} = m_{r2} < m_{a1} = m_{a2}$, the rotating magnet body 130 becomes magnetically balanced at a certain position on the power-generating block 140, maintaining a stable state.

In order to satisfy the above condition, the present invention is configured such that the power-generating magnets 170 have a magnetic intensity greater than those of the first and second magnets 150 and 160, and the interval $r_a$ between the power-generating magnets 170 and the power-generating core units 180 is greater than the interval $r_r$ between the first and second magnets.

In case of the first and second magnets 150 and 160, the power-generating magnets 170, and the power-generating core units 180 being arranged as such, when the rotating magnet body 130, which is magnetically separated because of the repulsive force between the first and second magnets, is ready to move away from the power-generating block 140, at a certain position, the attractive force between the power-generating magnets 170 and the power-generating core units 180 becomes greater than the repulsive force, so that the rotating magnet body 130 does not move away any more and keeps a stable state, which is called in the present invention a magnetically balanced equilibrium state.

Meanwhile, assuming that $m_{r1}$, $m_{r2}$, $m_{a1}$, $m_{a2}$, $r_r$, and $r^a$ satisfy the above condition and the respective values are as shown in table 1, the repulsive force and the attractive force according to a change in an interval between the rotating magnet body and the power-generating block change as follows:

TABLE 1

| $m_{r1}$ | $m_{r2}$ | $r_r$ | $m_{a1}$ | $m_{a2}$ | $r_a$ | Repulsive Force | Attractive Force |
|---|---|---|---|---|---|---|---|
| 2 | 2 | 0.5 | 3 | 3 | 1 | 16 | 9 |
| 2 | 2 | 1 | 3 | 3 | 1.5 | 4 | 4 |
| 2 | 2 | 1.5 | 3 | 3 | 2 | 1.778 | 2.25 |
| 2 | 2 | 2 | 3 | 3 | 2.5 | 1 | 1.44 |
| 2 | 2 | 2.5 | 3 | 3 | 3 | 0.64 | 1 |

Table 1 is a simple comparison of values provided only for illustrative purposes, so that the unit for the assumed values is omitted, and in the calculation of the repulsive force and attractive forces, k of equations 2 and 3 is considered to be 1 because it is a constant.

It can be seen in the table that as the rotating magnet body 130 and the power-generating block 140, i.e. two magnets, become closer, the repulsive force prevails over the attractive force, so that the rotating magnet body 130 cannot completely come into contact with the power-generating block, but is separated therefrom by means of repulsive force; as the repulsive force and the attractive force become identical to each other at a magnetically balanced equilibrium position, the rotating magnet body 130 maintains a stable state; and as the rotating magnet body 130 moves far away from the power-generating block 140, the attractive force prevails over the repulsive force, thereby preventing the rotating magnet body 130 from moving farther away.

Meanwhile, the first and second magnets 150 and 160, which produce the repulsive force, are the structures that extend along the circumferences of the rotating magnet body 130 and the power-generating block 140. Although the first and second magnets continuously produce repulsive force upon rotation of the rotating magnet body 130, the rotating magnet body 130 may vibrate due to a discontinuous attractive force because the power-generating magnet 170 and the power-generating core unit 180, which will produce the attractive force, consist of multiplicity.

Then, according to the present invention, the power-generating core units 180 are arranged in two-row structure in the power-generating block 140. Here, the two-row structure means that a first row of power-generating core units 180 is arranged about the fixing axis 121 in a circular form in the power-generating block 140, and a second row of power-generating core units 180' is further arranged in the circular first row of the core units 180. Here, all of the inner row of core units 180' and the outer row of core units 180 are arranged vertically downwards from the power-generating magnet 170.

Meanwhile, a gap control unit 210 is preferably provided in order to control the amount of power generation through regulating a gap between the rotating magnet body 130 and the power-generating block 140 depending on an external force applied to the rotor 110.

Figure 9:
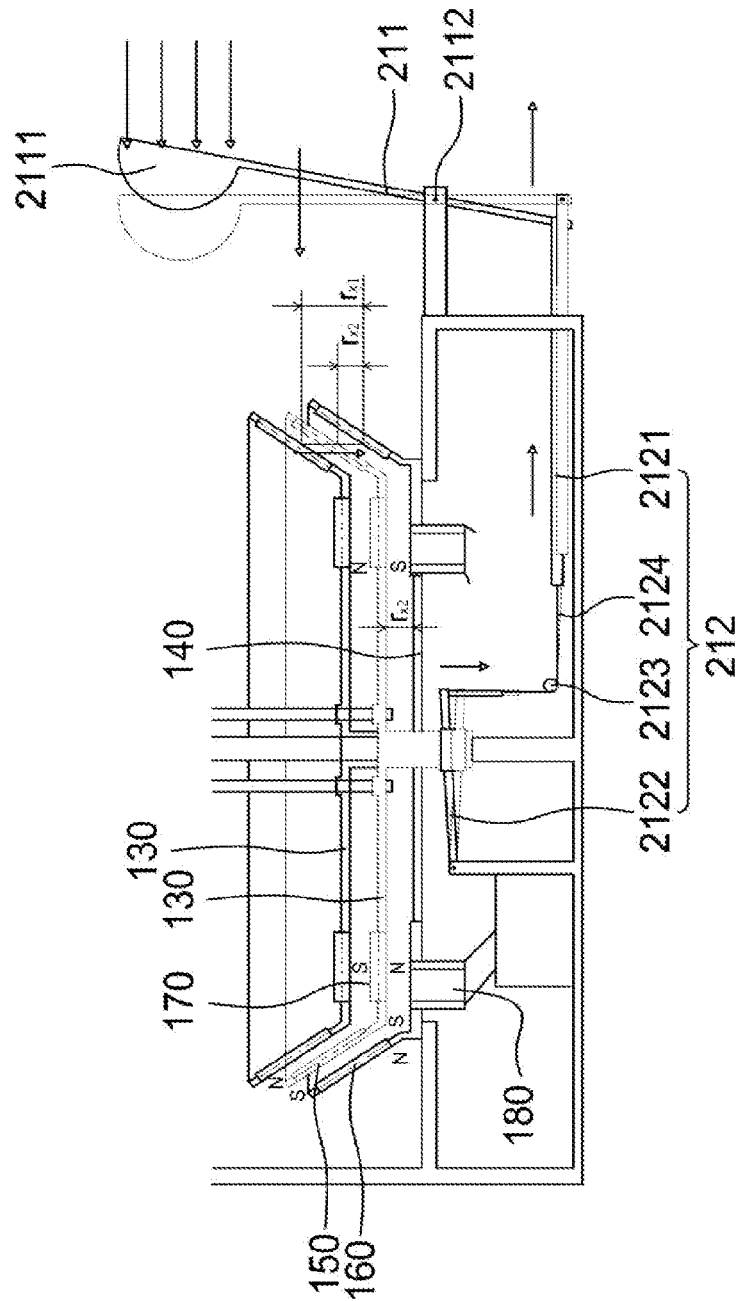
FIG. 9 is a front view illustrative of the structure of a gap control unit according to an embodiment of the present invention.

FIG. 9 is a front view illustrative of the structure of the gap control unit according to an embodiment of the present invention.

In case of the power-generating core units 180, which interacts with the power-generating magnets 170 to produce electricity, as they approach the power-generating magnets 170, they produce a greater amount of electricity, and vice versa. Then, when a strong external force is applied to the rotor 110, the gap control unit 210 lowers the rotating magnet body 130 such that the power-generating magnets 170 and the power-generating core units 180 become closer to each other, whereas, when a weak external force is applied to the rotor 110, the gap control unit 210 is operated such that the power-generating magnets 170 and the power-generating core units 180 are separated away by means of a repulsive force, thereby performing power generation depending on the magnitude of the wind velocity.

The gap control unit 210 consists of a reaction lever 211 and a connector 212.

The reaction lever 211 is hinge-coupled at its middle portion to the fixing structure 120 such that it rotates about a hinge axis 2112. The reaction lever has opposite ends, wherein one end is provided with a pocket 2111 for reception of external force, and the other end is connected with the rotating magnet body 130 via the connector 212.

When the reaction lever 211 interacts with external force and rotates, the connector 212 draws and lowers the rotating magnet body 130 so as to regulate the interval between the rotating magnet body 130 and the power-generating block 140. The connector includes a connecting rod 2121 extending from the other end towards inside of the fixing structure 120, a control rod 2122, an end of which is rotatably hinge-coupled to the fixing structure while being engaged with the rotating magnet body 130, and a connecting rope 2124 connecting the control rod 2122 and the connecting rod 2121 via a roller 2123 provided in the fixing structure 120.

When the reaction lever 211 rotates with external force, the connector 212 draws the rope 2124 via the connecting rod 2121 and the control rod 2122 rotates and draws the rotating magnet body 130, thereby lowering the rotating magnet body 130.

Thus, if the external force is wind power, as it increases, an angle increase, at which the reaction lever 211 rotates about the hinge axis 2112, and accordingly a distance also increases, for which the rotating magnet body 130 moves down. Thus, since the interval r between the power-generating magnet and the power-generating core unit decreases, 1/r increases so that the amount of generated electricity can be increased proportional to wind power.

That is, referring to the correlated equation $E = C_{p \times }(1/2) \times \rho \times A \times v^3$, there is an implementation in which, for the power generator suitable for a 3-dimension $v^3$, a device that corresponds to 3-dimension of $(1/r)^2 \times v_c$ is realized. Here, E indicates power-generation energy, $C_p$ indicates the efficiency, $\rho$ indicates air density, A indicates a cross section that is subject to wind, v indicates the wind velocity, $v_c$ indicates relative velocity of the power-generating magnet to the power-generating core unit according to the wind velocity, and r indicates a distance between the power-generating core unit and the power-generating magnet.

On the contrary, if the wind power becomes weakened, the rotating magnet body 130 moves up by means of repulsive force occurring between the first and second magnets 150 and 160, and at the magnetically balanced position where the repulsive force and the attractive force become balanced, i.e. reach a equilibrium state, the rotating magnet body rotates again while maintaining a stable state.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A magnetically balanced electric generator comprising:
   a rotor rotating under external force;
   a fixing structure having a fixing axis rotatably supporting the rotor;
   a rotating magnet body coupled with the fixing axis in such a manner as to be movable therealong, and engaged with the rotor so as to rotate together with the rotor;
   a power-generating block installed on the fixing structure while being vertically separated from a lower portion of the rotating magnet body;
   a first magnet mounted along the circumference of the rotating magnet body;
   a second magnet mounted along the circumference of the power-generating block and generating a repulsive force while repelling the first magnet, thereby magnetically separating the rotating magnet body from the power-generating block;
   a plurality of power-generating magnets mounted in the rotating magnet body and rotating about the fixing axis upon rotation of the rotating magnet body;
   a plurality of power-generating units mounted in the power-generating block such that they are positioned vertically downwards with respect to the power-generating magnet, and generating electricity because of interaction with the power-generating magnet upon rotation of the power-generating magnet; and
   a gap control unit moving the rotating magnet body with an interaction of an external force so as to control a gap between the rotating magnet body and the power-generating block and therefore a gap between the power-generating magnets and the power-generating core units, variably changing the amount of power generation.

2. The magnetically balanced electric generator according to claim 1, wherein the gap control unit includes a reaction lever hinge-coupled to the fixing structure and rotating about a hinge axis with external force; and, a connector, which upon rotation of the reaction lever, connects the reaction lever and the rotating magnet body so as to pull the rotating magnet body down.

3. The magnetically balanced electric generator according to claim 1, wherein the first and second magnets have a shape of a tapered cone, the upper portion of which is wider than the lower portion.

4. The magnetically balanced electric generator according to claim 1, wherein the external force is wind power.

* * * * *